(12) United States Patent
Lee et al.

(10) Patent No.: US 7,716,329 B2
(45) Date of Patent: May 11, 2010

(54) APPARATUS AND METHOD FOR DETECTING ANOMALOUS TRAFFIC

(75) Inventors: Eun Young Lee, Daejeon (KR); Seung Hyun Paek, Daejeon (KR); In Sung Park, Daejeon (KR); Joo Beom Yun, Daejeon (KR); Ki Wook Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 115 days.

(21) Appl. No.: 12/103,266

(22) Filed: Apr. 15, 2008

(65) Prior Publication Data

US 2009/0138590 A1 May 28, 2009

(30) Foreign Application Priority Data

Nov. 26, 2007 (KR) .................... 10-2007-0120935

(51) Int. Cl.
 *G06F 13/00* (2006.01)
(52) U.S. Cl. .................... 709/224; 709/236; 709/250
(58) Field of Classification Search ............... 709/223, 709/224, 230, 236, 250
See application file for complete search history.

(56) References Cited

U.S. PATENT DOCUMENTS

| 7,406,653 | B2 * | 7/2008 | Ide et al. | 714/799 |
|---|---|---|---|---|
| 7,424,619 | B1 * | 9/2008 | Fan et al. | 713/188 |
| 7,577,550 | B2 * | 8/2009 | Ozonat et al. | 702/186 |
| 2003/0236652 | A1 * | 12/2003 | Scherrer et al. | 703/2 |
| 2007/0150949 | A1 * | 6/2007 | Futamura et al. | 726/22 |
| 2007/0208497 | A1 * | 9/2007 | Downs et al. | 701/117 |

FOREIGN PATENT DOCUMENTS

| KR | 1020020024508 A | 3/2002 |
|---|---|---|
| KR | 1020040072365 A | 8/2004 |
| KR | 1020070000728 | 1/2007 |

OTHER PUBLICATIONS

Arno Wagner, et al; "Entropy Based Worm and Anomaly Detection in Fast IP Networks", Enabling Technologies: Infrastructure for Collaborative Enterprise International Workshops on; Jun. 13-15, 2005; pp. 172-177.

Ki-Hoon Kwon, et al; "Network Attack Detection Scheme With Multiple Entropy", 2005 Spring Joint Conference of KORMS/KIIE, May 13 to 14, 2005, Chungbuk National University, pp. 243-247.

* cited by examiner

*Primary Examiner*—Viet Vu
(74) *Attorney, Agent, or Firm*—Ladas & Parry LLP

(57) ABSTRACT

An apparatus and method for detecting anomalous traffic are provided. More particularly, an apparatus and method for detecting anomalous traffic based on entropy of network traffic are provided. The apparatus of detecting anomalous traffic includes: an entropy extraction module for extracting entropy from network traffic; a visualization module for generating an entropy graph based on the entropy; a graph model experience module for updating a graph model for each network attack based on the entropy graph; and an anomalous traffic detection module for detecting anomalous traffic based on the entropy graph and the graph model for each network attack and outputting the detection results to a user. In the apparatus and method, anomalous traffic is detected based on network entropy rather than simple statistics based on the amount of traffic, so that a false alarm rate of the apparatus for detecting anomalous traffic can be reduced.

11 Claims, 4 Drawing Sheets

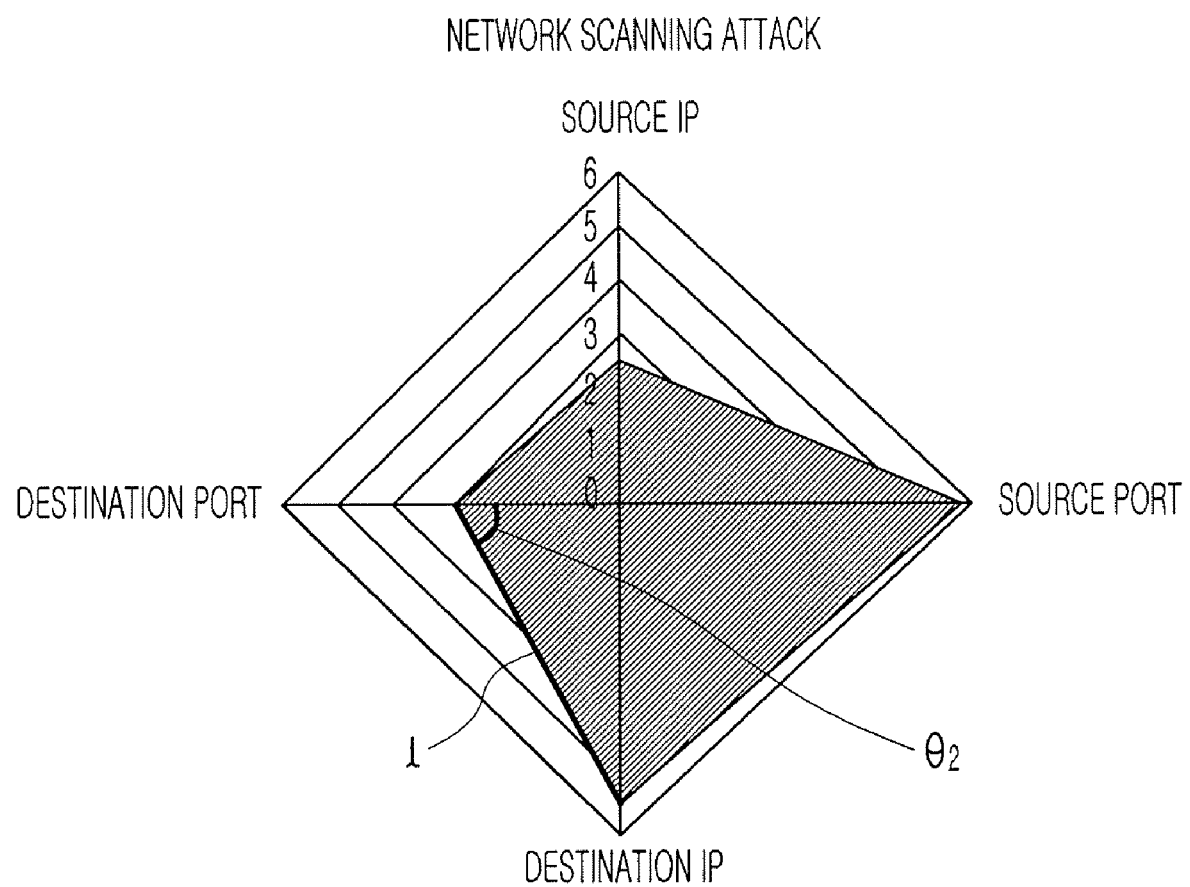

APPARATUS AND METHOD FOR DETECTING ANOMALOUS TRAFFIC

CROSS-REFERENCE TO RELATED APPLICATION

This application claims priority to and the benefit of Korean Patent Application No. 2007-120935, filed Nov. 26, 2007, the disclosure of which is incorporated herein by reference in its entirety.

BACKGROUND

1. Field of the Invention

The present invention relates to an apparatus and method for detecting anomalous traffic, and more particularly, to an apparatus and method for detecting anomalous traffic based on entropy of network traffic.

2. Discussion of Related Art

The development of network technology has also brought attacks targeting large scale networks such as distributed denial-of-service attacks or worm viruses, which can cause serious social problems. A method, in which a change in the number of packets or the amount of bytes is observed using a traffic characteristics analysis technique to detect anomalous traffic, is suggested as a method for detecting a network attack targeting a large scale network.

However, the conventional method for detecting anomalous traffic, which depends merely on the change in the amount, has a high false alarm rate. For example, it does not detect network attacks causing an insignificant change in the amount, or determines an excessive data flow in normal traffic as anomalous traffic.

SUMMARY OF THE INVENTION

The present invention is directed to an apparatus and method for detecting anomalous traffic, which analyzes traffic characteristics changeable according to type of network attack rather than a simple statistical analysis based on the amount of traffic, so that it can detect anomalous traffic more accurately and efficiently.

One aspect of the present invention provides an apparatus for detecting anomalous traffic, including: an entropy extraction module for extracting entropy from network traffic; a visualization module for generating an entropy graph based on the entropy; a graph model experience module for updating a graph model for each network attack based on the entropy graph; and an anomalous traffic detection module for detecting anomalous traffic based on the entropy graph and the graph model for each network attack and outputting the detection results to a user.

Another aspect of the present invention provides a method of detecting anomalous traffic, including: extracting entropy from network traffic; generating an entropy graph based on the entropy; updating a graph model for each network attack based on the entropy graph; detecting anomalous traffic based on the entropy graph and the graph model for each network attack; and outputting the detection results to a user.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 2A to 2C are entropy graphs for illustrating a method of calculating the degree of threat by a graph model training module according to an exemplary embodiment of the present invention.

DETAILED DESCRIPTION OF EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Figure 1:
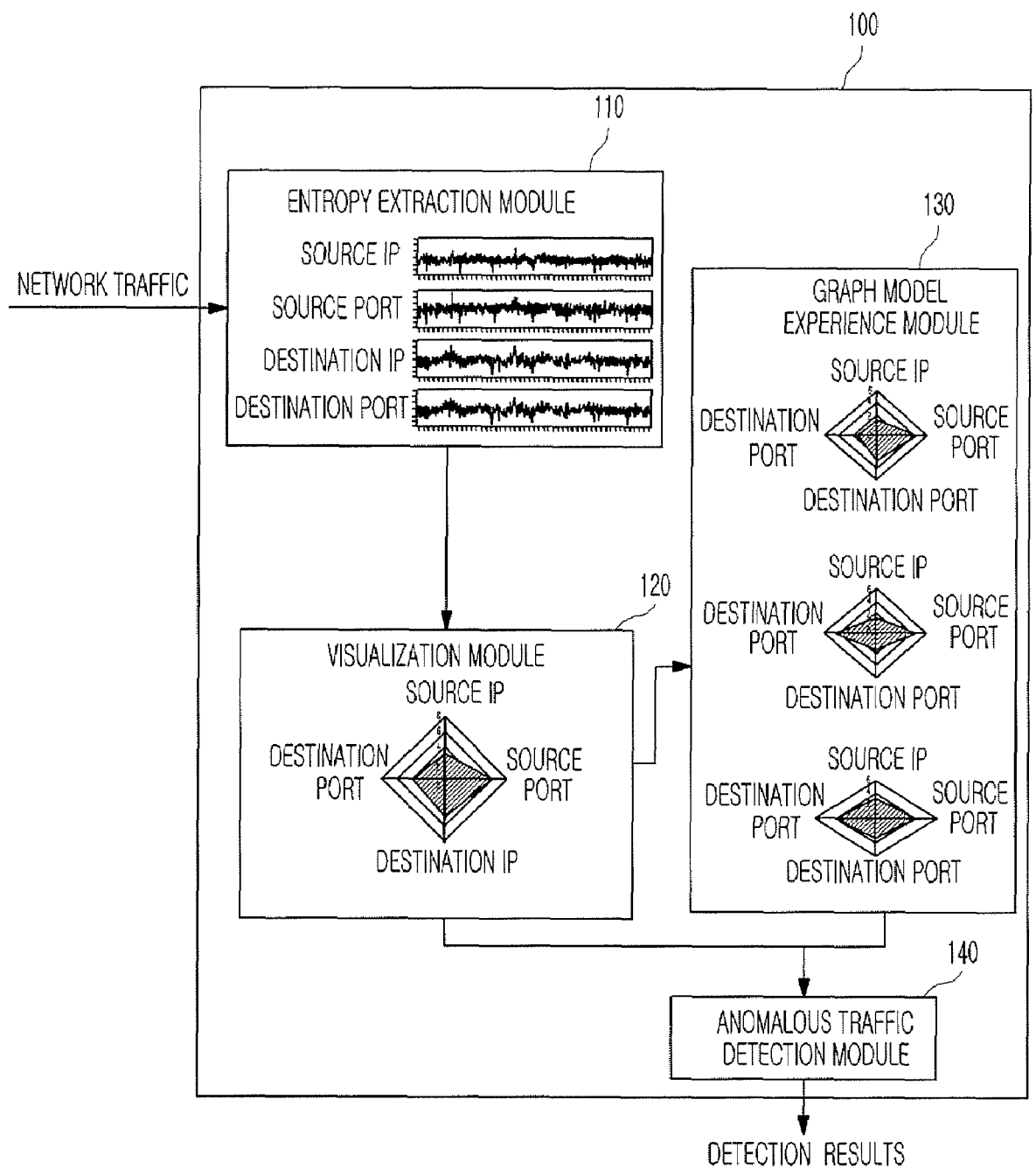
FIG. 1 is a block diagram illustrating the configuration of an apparatus for detecting anomalous traffic according to an exemplary embodiment of the present invention.

FIG. 1 is a block diagram illustrating the configuration of an apparatus for detecting anomalous traffic according to an exemplary embodiment of the present invention.

Referring to FIG. 1, the apparatus 100 for detecting anomalous traffic includes an entropy extraction module 110, a visualization module 120, a graph model experience module 130 and an anomalous traffic detection module 140.

The entropy extraction module 110 extracts entropy with respect to a source IP address, a source port, a destination IP address and a destination port from network traffic.

Here, the entropy refers to the uncertainty of a random variable, i.e., measurement of information uncertainty. Conventionally, the entropy has been used for compression or encoding of data. However, it is used for analyzing or detecting anomalous traffic recently. The entropy is generally defined as follows:

$$H(X) = -\Sigma p(x) \log p(x)$$

Here, p(x) denotes a rate of a packet having a specific variable value among the entire packets included in traffic. For example, in a case when a variable is a source port, p(x) can be represented as follows.

$$p(x) = \frac{\text{packet count of distinct [src port]}}{\text{total packet count}}$$

The visualization module 120 generates a radial entropy graph having 4 axes. Here, the 4 axes are axes for representing the source IP address entropy, the source port entropy, the destination IP address entropy and the destination port entropy, respectively. Therefore, the entropy graph corresponds to a 4-dimensional vector in the form of <source IP address entropy, source port entropy, destination IP address entropy, destination port entropy>. The entropy graph generated by the visualization module 120 is transferred to the graph model experience module 130 and the anomalous traffic detection module 140.

The graph model experience module 130 includes a graph model for each type of network attack, and updates the graph model based on the entropy graph transferred from the visualization module 120. In one exemplary embodiment, the type of network attack may include a denial of service attack, a network scanning attack and a host scanning attack.

In the process of updating the graph model, the graph model experience module 130 calculates a degree of threat for each type of network attack based on the entropy graph transferred from the visualization module 120, and may determine whether the graph model for each type of network attack is to be updated or not based on the calculated degree of threat. A method of calculating the degree of threat for each type of network attack will be described below with reference to FIGS. 2A to 2C.

The graph model experience module 130 includes 4-dimensional vector clusters for updating a graph model with respect to each type of network attack. Here, the graph model is an entropy graph corresponding to a centroid vector of each cluster. Accordingly, there may be one or more graph models for one type of network attack.

When it is determined to update a graph model for a specific type of network attack according to a result of calculation of the degree of threat, the graph model experience module 130 converts the entropy graph, transferred from the visualization module 120, into a 4-dimensional vector and performs clustering on the converted vector with 4-dimensional vectors included in the clusters corresponding to the specific type of network attack. In one exemplary embodiment, the clustering may be performed using a K-means algorithm, etc.

The clusters of 4-dimensional vector are reformed by the clustering, and a graph model corresponding to a centroid vector of each cluster is updated accordingly. Therefore, the graph model experience module 130 can continuously update an entropy pattern of network traffic for each type of network attack. The graph model experience module 130 transfers the graph model for each type of network attack to the anomalous traffic detection module 140.

The anomalous traffic detection module 140 compares the graph model transferred from the graph model experience module 130 with the entropy graph transferred from the visualization module 120 to determine occurrence of anomalous traffic and a type of network attack of the anomalous traffic, and outputs the detection results to a user.

Figure 2A:
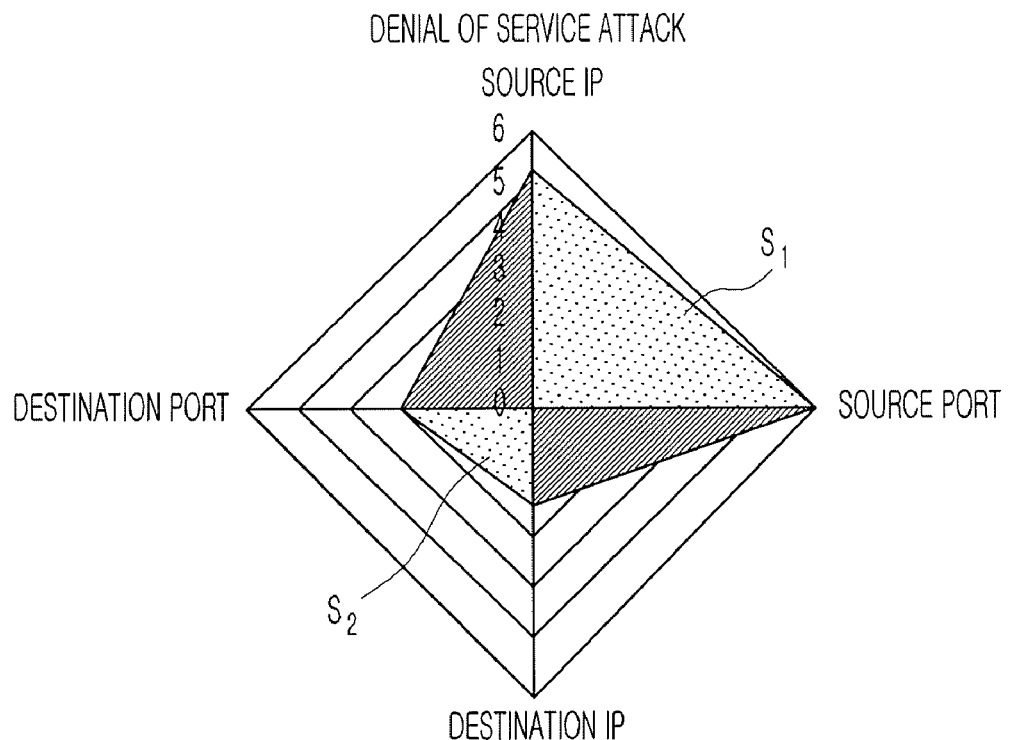
Figure 2B:
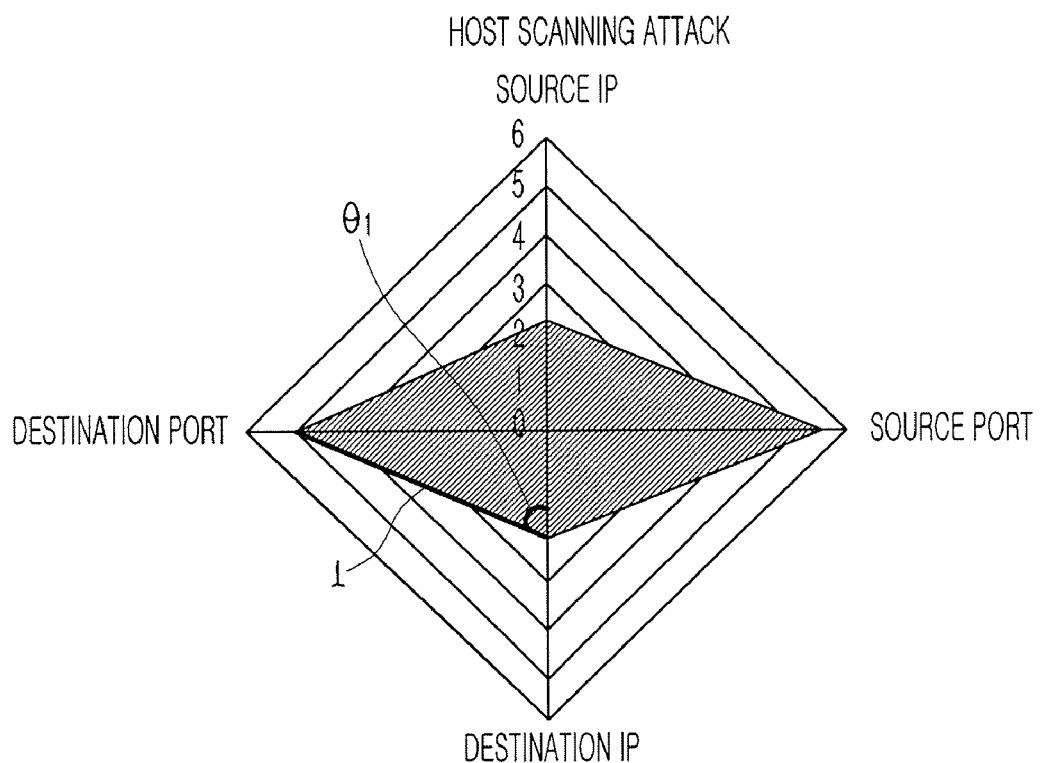

FIGS. 2A to 2C are entropy graphs for illustrating a method of calculating the degree of threat by a graph model experience module according to an exemplary embodiment of the present invention.

In order to determine whether a graph model for each type of network attack is to be updated or not, a graph model experience module calculates a degree of threat for each type of network attack based on an entropy graph received from a visualization module. A method of calculating the degree of threat for a denial of service attack, a network scanning attack and a host scanning attack will be described below.

Referring to FIG. 2A, when the degree of threat for the denial of service attack is high, generally, the distribution of a source IP address and a source port is more spread than that of a destination IP address and a destination port. Since entropy increases as the distribution spreads, in the entropy graph, the area $S_1$ of a first quadrant denotes the degree of spread of the source IP address and the source port, and the area $S_2$ of a third quadrant denotes the degree of spread of the destination IP address and the destination port. Therefore, the graph model experience module can calculate the degree of threat for the denial of service attack based on a difference between the area $S_1$ of the first quadrant and the area $S_2$ of the third quadrant of the entropy graph. Here, as the area $S_1$ of a first quadrant is larger than the area $S_2$ of a third quadrant, the degree of threat for the denial of service attack is increased.

Referring to FIG. 2B, when the degree of threat for the host scanning attack is high, the distribution of a destination IP address is concentrated and the distribution of a destination port is spread. Therefore, the graph model experience module can calculate the degree of threat for the host scanning attack based on the length 1 of a line that is formed by connecting an entropy value on a destination port axis to an entropy value on a destination IP address axis, i.e., a line positioned in a third quadrant and an angle $\theta_1$ between the line positioned in a third quadrant and the destination IP address axis. Here, the degree of threat for the host scanning attack is increased as the length 1 and the angle $\theta_1$ increase.

Referring to FIG. 2C, when the degree of threat for the network scanning attack is high, in contrast to the host scanning attack, the distribution of a destination IP address is spread, and the distribution of a destination port is concentrated. Therefore, the graph model training module can calculate the degree of threat for the network scanning attack based on the length 1 of a line positioned in a third quadrant and an angle $\theta_2$ between the line positioned in a third quadrant and a destination port axis. Here, the degree of threat for the network scanning attack is increased as the length 1 and the angle $\theta_2$ increase.

Figure 3:
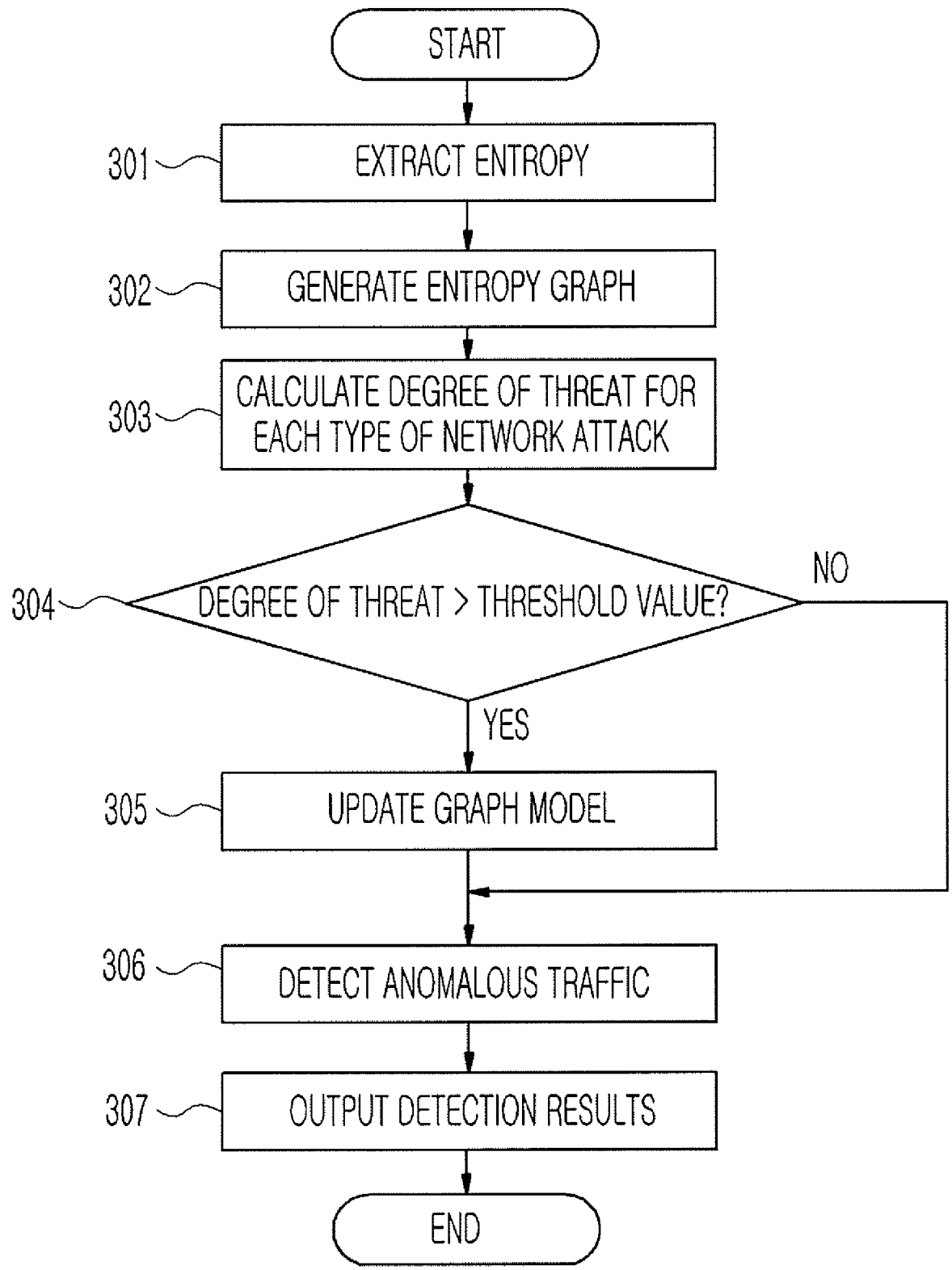
FIG. 3 is a flowchart illustrating a method for detecting anomalous traffic according to an exemplary embodiment of the present invention.

FIG. 3 is a flowchart illustrating a method for detecting anomalous traffic according to an exemplary embodiment of the present invention.

Referring to FIG. 3, an entropy extraction module receives network traffic, and extracts entropy with respect to a source IP address, a source port, a destination IP address and a destination port from the received network traffic, respectively (301). When the extraction of the entropy is completed, a visualization module generates an entropy graph having 4 axes where the source IP address entropy, the source port entropy, the destination IP address entropy and the destination port entropy are plotted along each axis based on the extracted entropy (302).

Then, the graph model experience module calculates the degree of threat for each type of attack based on the generated entropy graph (303). As described with reference to FIGS. 2A to 2C, the graph model experience module can analyze the entropy graph according to entropy characteristics of each type of network attack to calculate the degree of threat.

When the degree of threat for each type of network attack is calculated, the graph model experience module compares the degree of threat for each type of network attack with a predetermined threshold value (304). In one exemplary embodiment, the threshold value may be set differently depending on a type of network attack, and a plurality of graph models may be simultaneously updated according to the comparing results.

When the degree of threat for the specific network attack is larger than the threshold value, the graph model experience module updates a graph model corresponding to type of the specific network attack (305). As described above, the graph model experience module converts the entropy graph into a 4-dimensional vector and performs clustering on the converted vector together with 4-dimensional vectors of clusters corresponding to the specific type of network attack to update a graph model. The updated graph model is transferred to an anomalous traffic detection module to detect anomalous traffic.

The anomalous traffic detection module detects anomalous traffic based on the entropy graph transferred from the visualization module and the graph model corresponding to each type of network attack (306). The anomalous traffic detection module calculates a distance between 4-dimensional vectors corresponding to the entropy graph and the graph model, and when the distance is equal to or shorter than a predetermined threshold value, it may be determined that anomalous traffic occurs. When detection is completed, the anomalous traffic detection module outputs the detection results to a user (307).

In the above-described method of detecting anomalous traffic, a computer readable code can be implemented in computer readable recording media. The computer readable recording media may include every kind of recording device in which data that a computer system can read is recorded. The recording media that a computer system can read includes ROM, RAM, CR-ROM, magnetic tape, a floppy disk, and an optical data storage device, etc., and may include carrier waves (e.g., transmission through the Internet). Also, the computer readable recording media may be distributed computer systems connected to networks, so that codes that computers can read are stored and executed in a distribution method.

In the present invention, anomalous traffic is detected based on network entropy rather than simple statistics based on the amount of traffic, so that a false alarm rate of an apparatus for detecting anomalous traffic can be reduced.

Also, since a graph, in which entropy is visualized, is provided to a user, the user can intuitively understand a network state without complicated statistical knowledge.

In addition, since a graph model that is used for detecting anomalous traffic is continuously updated, in the present invention, anomalous traffic can be detected efficiently with a network state that is dynamically changed.

It will be understood by those of ordinary skill in the art that various changes in form and detail may be made to the exemplary embodiments without departing from the spirit and scope of the present invention as defined by the following claims.

What is claimed is:

1. An apparatus for detecting anomalous traffic, comprising:
   an entropy extraction module for extracting entropy from network traffic;
   a visualization module for generating an entropy graph based on the entropy;
   a graph model experience module for updating a graph model for each network attack based on the entropy graph; and
   an anomalous traffic detection module for detecting anomalous traffic based on the entropy graph and the graph model for each network attack and outputting the detection results to a user.

2. The apparatus of claim 1, wherein the entropy comprises source IP address entropy, source port entropy, destination IP address entropy, and destination port entropy.

3. The apparatus of claim 2, wherein the entropy graph is a radial graph that represents the source IP address entropy, the source port entropy, the destination IP address entropy, and the destination port entropy.

4. The apparatus of claim 1, wherein the graph model experience module calculates a degree of threat for each network attack based on the entropy graph, and determines whether a graph model for each network attack is to be updated or not based on the degree of threat.

5. The apparatus of claim 1, wherein the graph model experience module comprises one or more 4-dimensional vector clusters corresponding to each network attack, and the graph model corresponds to centroid vectors of the one of more 4-dimensional vector clusters corresponding to each network attack.

6. The apparatus of claim 5, wherein the graph model experience module performs clustering on the 4-dimensional vector clusters corresponding to each network attack using the entropy graph generated by the visualization module.

7. A method of detecting anomalous traffic, comprising:
   extracting entropy from network traffic;
   generating an entropy graph based on the entropy;
   updating a graph model for each network attack based on the entropy graph;
   detecting anomalous traffic based on the entropy graph and the graph model for each network attack; and
   outputting the detection results to a user.

8. The method of claim 7, wherein the entropy comprises source IP address entropy, source port entropy, destination IP address entropy, and destination port entropy.

9. The method of claim 8, wherein the entropy graph is a radial graph that represents the source IP address entropy, the source port entropy, the destination IP address entropy, and the destination port entropy.

10. The method of claim 7, wherein the updating the graph model for each network attack comprises:
    calculating a degree of threat for each network attack based on the entropy graph;
    determining whether the graph model for each network attack is to be updated or not based on the degree of threat; and
    updating the graph model for each network attack according to the determination.

11. The method of claim 7, wherein the updating the graph model for each network attack comprises performing clustering on 4-dimensional vector clusters corresponding to each network attack using the entropy graph.

* * * * *